(No Model.)
J. B. HANNAY.
APPARATUS FOR APPLYING CHLORINE TO THE EXTRACTION OF GOLD FROM ORES.
No. 412,610. Patented Oct. 8, 1889.
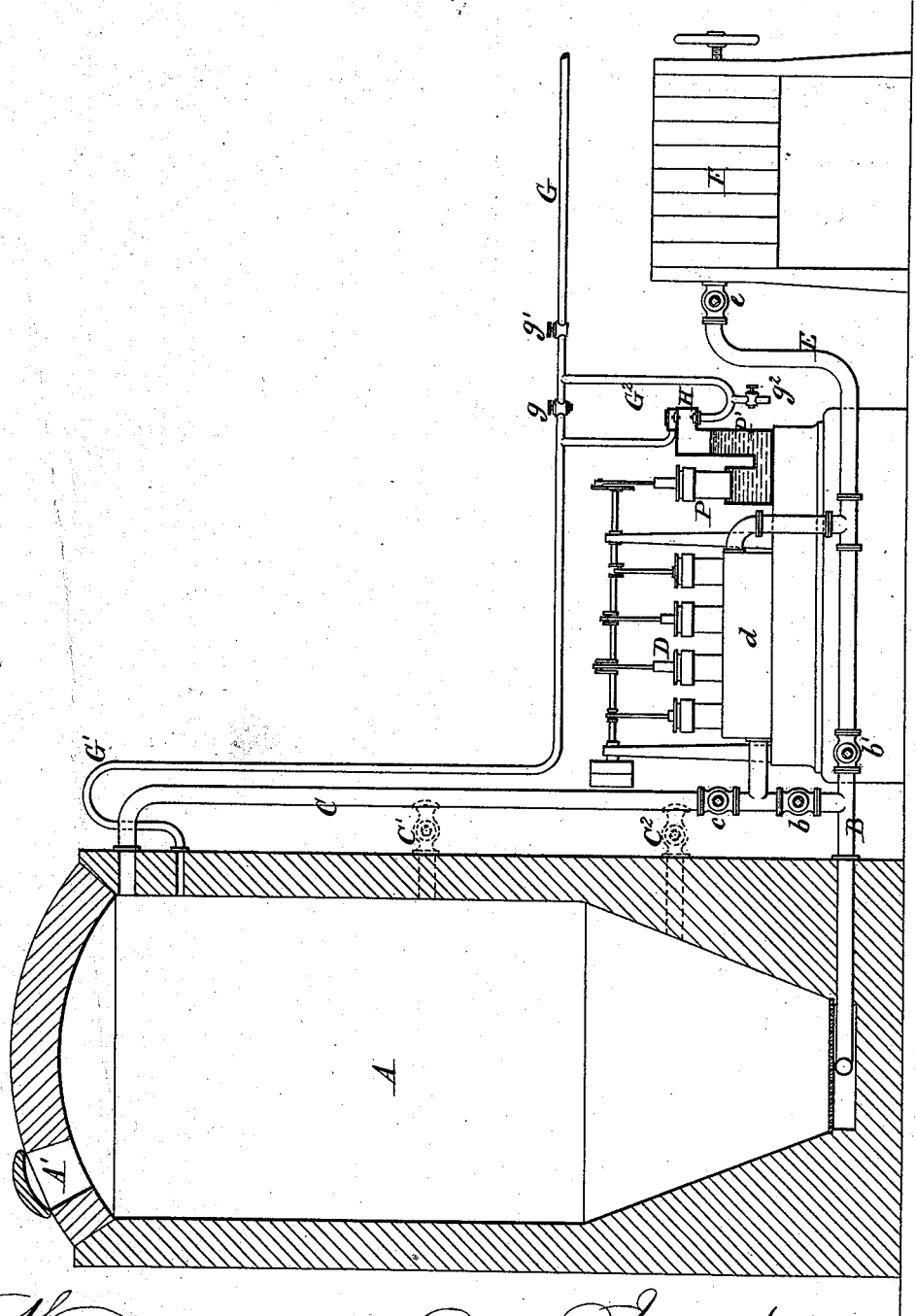

UNITED STATES PATENT OFFICE.

JAMES BALLANTYNE HANNAY, OF COVE CASTLE, LOCH LONG, COUNTY OF DUMBARTON, SCOTLAND.

APPARATUS FOR APPLYING CHLORINE TO THE EXTRACTION OF GOLD FROM ORES.

SPECIFICATION forming part of Letters Patent No. 412,610, dated October 8, 1889.

Application filed April 17, 1889. Serial No. 307,582. (No model.) Patented in England January 16, 1889, No. 841; in France April 6, 1889, No. 197,279, and in Belgium April 6, 1889, No. 85,732.

*To all whom it may concern:*

Be it known that I, JAMES BALLANTYNE HANNAY, a subject of the Queen of Great Britain, residing at Cove Castle, Loch Long, in the county of Dumbarton, Scotland, have invented a new and useful Apparatus for Applying Chlorine to the Extraction of Gold from Ores, (for which I have obtained patent in Great Britain, dated January 16, 1889, No. 841; France, dated April 6, 1889, No. 197,279, and Belgium, dated April 6, 1889, No. 85,732,) of which the following is a specification.

My invention relates to means of extracting from ores precious metals, especially gold, in the form of chloride solution. For this purpose I employ apparatus which consists of a chlorinating-vessel, a set of circulating-pumps, a filter-press, and a chlorine-pump, or sets of these, with suitable communicating pipes, cocks, and valves for operating in the following manner: Having reduced the ore to a fine powder, I mix it with water or with chlorinated water to a condition of thin sludge, which can be pumped. I charge the chlorinating-vessel with this sludge and apply the pumps to cause its circulation therein, drawing from the upper part and discharging into the lower part, while chlorine gas is pumped into the vessel, preferably to a pressure considerably above that of the atmosphere. After circulation has gone on for some time, until the metal in the ore is mostly dissolved by the chlorine, the sludge is pumped by the circulating-pumps into the filter-press, additional pressure being given, if required, by using the chlorine-pump to force air into the upper part of the chlorinating-vessel. The liquid issuing from the filter-press containing in solution the metallic chloride is treated in any of the known ways for separating the metal and recovering the chlorine. In some cases the solution discharged from the filter-press may be used in a subsequent operation to form the sludge by its admixture with a fresh quantity of pulverized ore, and this may be done repeatedly, so as to obtain finally a filtered liquor rich in chloride.

As it is advantageous to charge the chlorinating-vessel with an excess of chlorine above that which enters into combination with the metals, I prefer to collect such excess before discharging the sludge by blowing in a little steam to warm the sludge and allowing the free chlorine thus liberated to pass either into a gasometer or into another chlorinating-vessel; or an exhaust-pump may be employed to draw off the free chlorine.

When metals such as silver are present, having insoluble chlorides, the blocks which are taken from the filter-press, and which contain these chlorides, may be reduced to sludge, as before mentioned, and may be subjected to the same treatment with a suitable solvent instead of the chlorine.

Although I by preference employ a filter-press in combination with the chlorinating apparatus, obviously the chlorinated sludge might be filtered by other means.

In many situations—as, for example, at the mines where the ore is found—it is difficult to obtain chlorine, and the transport of materials for its production on the spot involves great expense and inconvenience. It is also difficult, and often impossible, to transport chlorine in the gaseous form on account of the large bulk which it occupies. In order to provide against these difficulties, I produce chlorine in liquefied condition and store it in this condition in vessels which can be readily and conveniently transported, and from which it can be drawn for use when required. Apparatus for this purpose forms the subject-matter of a patent application of even date herewith.

Such being the general character of my invention, I shall describe the apparatus which I employ, referring to the accompanying drawing, in which the figure is an elevation, partly in section, of the chlorinating apparatus.

A is the chlorinating-vessel, which is charged through the man-hole A' with comminuted ore, this ore being mixed either externally or in the vessel with water, or partly with the liquid resulting from previous operations, into the condition of thin sludge that can be pumped. The vessel A communicates, by a pipe B from its bottom and a pipe C from its top, with the suction-opening d of a set of circulating-pumps D, each of these pipes being furnished with a cock or valve $b$ and $c$, respectively. The pipe B also communicates, through a cock or valve $b'$, with the discharge-opening of the pumps D, which also communicates by a pipe E, having cock or valve $e$, with a filter-press F, which latter may be of any known type. By a pipe G gaseous chlorine produced in any known manner or evolved from a holder of liquefied chlorine—such as is above referred to—passes either directly, by opening a cock or valve $g$, to a siphon-bend G', opening into the upper part of the vessel A, or by closing the cock or valve $g$ it has to pass through an inverted siphon-bend $G^2$ and a valve-box H, communicating with a pump P, which is charged with water. As the plunger of the pump P moves up and down, displacing the water contained in its barrel and in the upright pipe P', the chlorine is drawn in by the pipe $G^2$ and discharged under pressure by the siphon-bend G' into the vessel A. The pump P may also be used as an air-compressing pump, the supply of chlorine being cut off by closing a cock or valve $g'$, and air being admitted to the suction-opening of the pump by opening a cock or valve $q^2$.

This apparatus operates in the following manner: The vessel A being charged with the almost liquid ore-sludge and the manhole being tightly closed, the several cocks or valves are set, $c\ b'\ g'$ open and $b\ e\ g\ q^2$ closed, and the pumps D and P are worked. Chlorine is thus forced into the sludge, which is kept circulating from the top of A down the pipe C to the pumps D, and thence by the pipe B to the bottom of A. When the metal is dissolved or mostly dissolved by the chlorine, as may be ascertained by testing a sample drawn from either of the pipes B or C, the cocks or valves are shifted, $c, b', g, g'$, and $g^2$ being closed and $b\ e$ opened. By the pumps D the sludge is now drawn from the bottom of A and forced into the filter-press F, while by opening $g^2$ and working P air may be forced by the pump P into A, expelling the contents of A.

It is sometimes necessary to maintain the circulation of the sludge while a portion of it is passing to the filter-press. In order to provide for this, there may be several branches, as $C'\ C^2$, at different levels communicating with C, with stop-cocks or valves. By opening one or other of these while the cocks or valves $b'$ and $e$ are partially opened, $b$ closed, and $c$ opened, circulation will go on while part of the contents of A pass to the filter-press F. The liquid forced out from the filter-press F, containing the gold in solution, is then treated in any known manner for eliminating the gold, the spent liquor or the liquor itself, before subsequent treatment, being employed wholly or in part for making up the sludge for a subsequent operation.

Having thus described the nature of my said invention and in what manner the same is to be performed, I claim—

1. In apparatus for applying chlorine to the extraction of gold from ores, the combination of a closed vessel to be charged with the ore-sludge to be treated, pumps for circulating the sludge through the said vessel, a pipe connecting the upper part of the said vessel with the suction-opening of the said pumps, a pipe connecting the lower part of the said vessel with the delivery-opening of the pumps, a pump for supplying chlorine gas under pressure into the said vessel, a pipe connecting the suction-opening of the said pump with a supply of chlorine gas, and a pipe connecting the discharge-opening of the said pump with the upper part of the said vessel, substantially as herein described.

2. In apparatus for applying chlorine to the extraction of gold from ores, the combination of a closed vessel to be charged with the ore-sludge to be treated, pumps for circulating the sludge through the said vessel, a pipe connecting the upper part of the said vessel with the suction-opening of the said pumps, a pipe connecting the lower part of the said vessel with the delivery of the pumps, a filter-press connected by a pipe to the discharge-opening of the circulating-pump for receiving the sludge after treatment in the said vessel, a pump for supplying chlorine gas under pressure into the said vessel, a pipe connecting the suction-opening of the said pump with a supply of chlorine gas, and a pipe connecting the discharge-opening of the said pump with the upper part of the said vessel, substantially as herein described.

3. The combination, with the chlorinating-vessel A, of circulating-pumps D, pipes B, provided with cocks $b\ b'$, connecting with the suction and delivery openings of the pumps, the pipe C, having cock $c$, and connecting with the suction-opening of the pumps and with the pipe B, a suitable filter-press F, and the pipe E, having cock $e$, and connected with the filter-press and with the pipe B, substantially as described.

4. The combination, with the chlorinating-vessel A, of a pump P, connected to a chlorine-supply by pipes G $G^2$, shut-off cocks $g\ g'$, air-inlet cock $g^2$, and pipe G', communicating with pipe G and with the chlorinating-vessel, substantially as and for the purposes described.

In testimony whereof I have signed my name to this specification, in the presence of two subscribing witnesses, this 4th day of April, A. D. 1889.

J. B. HANNAY.

Witnesses:
OLIVER IMRAY,
*Patent Agent, 28 Southampton Buildings, London, W. C.*
JNO. P. M. MILLARD,
*Clerk to Messrs. Abel & Imray, Consulting Engineers and Patent Agents, 28 Southampton Buildings, London, W. C.*